(12) United States Patent
Saha et al.

(10) Patent No.: US 11,836,037 B2
(45) Date of Patent: Dec. 5, 2023

(54) SYSTEMS AND METHODS FOR ARTIFICIAL INTELLIGENCE-BASED ROOT CAUSE ANALYSIS OF SERVICE INCIDENTS

(71) Applicant: salesforce.com, inc., San Francisco, CA (US)

(72) Inventors: Amrita Saha, Singapore (SG); Chu Hong Hoi, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 78 days.

(21) Appl. No.: 17/476,892

(22) Filed: Sep. 16, 2021

(65) Prior Publication Data

US 2022/0358005 A1    Nov. 10, 2022

Related U.S. Application Data

(60) Provisional application No. 63/185,167, filed on May 6, 2021.

(51) Int. Cl.
*G06F 11/07* (2006.01)
(52) U.S. Cl.
CPC ........ *G06F 11/079* (2013.01); *G06F 11/0706* (2013.01)

(58) Field of Classification Search
CPC ............ G06F 11/0706; G06F 11/0751; G06F 11/079; G06F 11/0793
See application file for complete search history.

(56) References Cited

U.S. PATENT DOCUMENTS 10,332,012 B2 * 6/2019 Reddy .................... G06F 16/00
2020/0401910 A1 * 12/2020 Hassanzadeh ...... G06F 16/9024

* cited by examiner

*Primary Examiner* — Joseph R Kudirka
(74) *Attorney, Agent, or Firm* — HAYNES AND BOONE, LLP

(57) ABSTRACT

Some embodiments of the current disclosure disclose methods and systems for analyzing root causes of an incident disrupting information technology services such as cloud services. In some embodiments, a set of problem review board (PRB) documents including information about said incidents may be parsed using a natural language processing (NLP) neural model to extract structured PRB data from the unstructured investigative information contained in the PRB documents. The structured PRB data may include symptoms of the incident, root causes of the incident, resolutions of the incidents, etc., and a causal knowledge graph causally relating the symptoms, root causes, resolutions of the incidents may be generated.

20 Claims, 17 Drawing Sheets

| | |
|---|---|
| Number of Incident Investigations | 1716 |
| Incident Investigations with non-empty Resolution and Post Action Review | 1655 |

| Average Stats (mean ± std) of Raw & Extracted PRB data fields | |
|---|---|
| Length (non-stopwords) of PRB Subject Text | 5.23 ± 2.93 |
| Number of Updates in PRB Investigation Document | 3.71 ± 4.13 |
| Length (non-stopwords) of full PRB Investigation Document | 309.66 ± 732.15 |
| Length ("-") of each Investigation Update | 60.19 ± 40.69 |
| Length ("-") of PRB Resolution Document | 18.28 ± 24.83 |
| Length ("-") of PRB Post Action Review Document | 110.11 ± 159.01 |
| Recall of PRB Resolution words appearing in Investigation | 65.68% |
| Recall of Post Action Review words appearing in Investigation | 21.27% |
| Length (non-stopwords) of extracted Symptom | 4.08 ± 2.82 |
| Length ("-") of extracted Investigation Topics | 3.13 ± 0.99 |
| Length ("-") of extracted Investigation Summary (default/short) | 41.64 ± 31.86 |
| Length ("-") of extracted Investigation Summary (detailed) | 52.02 ± 22.13 |
| Length ("-") of extracted Root Cause | 5.92 ± 4.12 |
| Length ("-") of extracted Resolutions | 5.03 ± 3.29 |

| Sev Wise Avg Stats | Sev0 | Sev1 | Sev2 |
|---|---|---|---|
| Percentage of Incidents | 3.61% | 31.23% | 65.15% |
| Length of PRB Investigation | 1479 ± 2680.2 | 418.38 ± 707 | 192.7 ± 299.4 |
| Length of PRB Resolution | 27.81 ± 32.33 | 20.8 ± 29.43 | 16.54 ± 21.48 |
| Length of Post Action Review | 185.8 ± 162.5 | 152.17 ± 150.6 | 85.75 ± 157.21 |

| Incident Subject: <Pod> Connpool  Host: <Pod> TimeStamp: <Date, Time> | |
|---|---|
| Investigation Updates | Update 1: <Date> <Time>: <Team1, Team2> and <Team3> team are on the incident bridge investigating the issue. High Gacks, APTs, ConnPools and excessive null requests across all db node observed on the instance. Impact on the pod was deemed as a service disruption with regards to excessive APTs, and impact to logins overall. Nodes 1,4 were shutdown by <Team3> and performance improved. A rolling restart of the application tier is underway.<br><br>Update 2: <Date> <Time>: <Pod> was hit with a period of service due to a database misconfiguration problem on node 4......... Once node 4 shut down normal processing resumed. Issue was with high wait on SQ, its a sequencing issue but not sure what caused it. An ssh issue was also noticed on node 7 but this appears to be unrelated. |
| Immediate Resolution: Shutdown Nodes 1,4. Rolling restart of application tier. | Symptom: Connpool<br><br>Investigation Key Topics<br>• high gacks, connpools & excessive null requests across db nodes service disruption due to<br>• high apts<br>• shutdown by cdse<br>• application tier<br>• db misconfiguration<br>• ssh issue<br><br>Investigation Summary: High Gacks, APTs ConnPools & excessive null requests across db nodes. Node 1,4 were shutdown by <Team3> performance improved<br><br>Root Cause<br>• <DB>/Vendor bug Process gap in PSU patching<br><br>Immediate Resolution<br>• shutdown<br>• rolling restart |
| Post Action Review | There are couple of Contributing factors identified during the retro: Process gap in PSU patching - Patching team accidentally patched <Pod> Primary assuming its DR. Patching Roll back decision was delayed in all incidents that impacted <Pod>, database team observed active session spikes(in the range of 2-3K) on 'log file switch(checkpoint incomplete)' wait event on one of the node and ultimately running out of all database processes on that node. Also, since LGWR background process was blocked on the affected node, it impacted other nodes as well leading to customer impact. ... This will appear like a DB hang for the application. Ideally this is observed when there is a very high amount of changes happening in the database, online redo log files getting filled faster and checkpoint is not able to catch up with it, hence log writer not able to re-use the older online redo log files. But in <Pod> we observed it even when there were very minimum database activities(changes). This is an unexpected behavior and is potentially an <DB>/Vendor bug. If older online redo log file is not checkpointed log writer process will halt. ............... |

| InfoType | Total | Annotation Labels & Overall Metrics ||||
|---|---|---|---|---|---|
| | | WellFormed: 1276 | Informative: 1009 | Unclear: 60 | Uninterest-ing: 248 | Has Extra words: 15 |
| Topics | 1320 | WellFormed: 1276 | Informative: 1009 | Unclear: 60 | Uninteresting: 248 | Has Extra words: 15 |
| Summary | 525 | Informative: 435 | Too Specific: 46 | | Too Generic: 43 | |
| Root Cause | 320 | Exact Match: 79.07% | F1(Bag Of NonStop Words): 87.97% | | F1(Bag Of All Words): 88.44% | |
| Resol-ution | 175 | Exact Match: 70.34% | F1(Bag Of NonStop Words): 81.57% | | F1(Bag Of All Words): 81.69% | |

Table 2: Human validated results of Information Extraction

*FIG. 8*

| | |
|---|---|
| ROOT CAUSES | SERVICE DISRUPTION: LGWR blocked by a FG process causing db hangs post TLS rollout. Posting my long-overdue post to bring awareness on the beneficial impact of the proactive detection of LGWR blocked by a FG process" has had in our infrastructure. ▓▓▓▓▓▓▓▓▓▓▓▓▓▓▓▓▓▓▓ ▓▓ ▓▓▓ ▓▓▓▓▓▓ which is a critical BG process as a result it causes Service Disruption. This has impacted across many PODs, immediately after rolling out TLS. Details about: the <DB> bug that's causing the deadlocks. "The root cause for LGWR hang is because ▓▓ ▓▓▓▓▓▓ ▓▓▓▓▓▓▓ ▓▓▓▓▓▓▓ ▓▓▓▓ ▓▓ ▓▓▓▓▓▓▓ ▓ ▓▓▓▓▓▓▓ for the use of malloc() in the network code. NTZ layer (used for TCPS ) uses routines that are not async-signal-safe. ▓▓▓▓▓ ▓ ▓▓▓ ▓▓▓▓ ▓▓▓▓▓▓ ▓▓▓▓▓ ▓▓▓▓▓▓▓ like calling malloc() from a signal handler (for SIGALRM) in the network code, is the cause for the hang observed. The use of ... before it hangs db ... ...<br><br>CONNPOOL ISSUE: Main reason for the issue was ▓▓▓ ▓▓▓▓▓ ▓▓▓▓▓ ▓▓ ▓▓▓▓▓ ▓▓▓▓▓ ▓▓▓▓▓ ▓▓ ▓▓▓▓▓▓▓▓. The problem queries involved filters on the contact.email field in person account queries.<br><br>MQ INSTANCES EXPERIENCING MQ DELAY. A ▓▓▓▓▓▓▓ ▓▓▓▓ in open source HBase <release version> disabled log cleaning. This caused ▓▓▓▓▓▓▓▓▓▓ ▓▓ ▓▓▓ ▓▓▓▓▓▓▓▓▓▓ in the /hbase/ oldWALs directory and trapped a limit on the number of files in an HDFS directory. This caused region servers to fail whenever they tried to archive WAL files and abort. The ▓▓▓▓▓▓▓ ▓▓ ▓▓▓▓▓▓ ▓▓▓▓▓▓ ▓▓▓▓▓▓▓ ▓▓▓▓▓▓ caused a cascading chain of events which resulted in ▓▓▓▓▓ ▓▓▓▓▓▓▓▓▓▓. |
| REMEDIATION | CONNECTION POOL TIMEOUTS: Issue was caused by requests <link> from <org>. This caused two periods of connection pool timeouts. SR ▓▓▓▓▓▓▓▓▓▓ ▓ ▓▓▓▓▓▓▓ ▓▓▓▓▓▓ ▓▓▓ ▓▓▓ ▓▓▓▓▓ above at 0.5 req per app and this resolved impact. During the impact times a number of automatic cap throttles were seen to go in confirming the same org/url pattern<br><br>MESSAGEQUEUE TEST FAILING: Looks like capacity may have been an issue here. <Node> has <partitions> as there are some large multinode customers on other nodes. <TeamName> were engaged to see if any rebalancing could be done but traffic looked evenly balanced. SR ▓▓▓▓▓▓▓▓▓▓ ▓▓▓▓ ▓▓▓▓▓ ▓▓▓▓▓ ▓▓▓▓▓ to help resolves the issue. |

*FIG. 9*

| Symptom Clusters | % | Root-Cause Clusters | % | Resolution Clusters | % |
|---|---|---|---|---|---|
| connection pool, high, active requests | 20.65 | the db cpu, materialized view logs, hangs post tls | 4.7 | app tier, ops sfdc net, appeals restore access | 7.41 |
| db nodes, ops sfdc net mq, high cpu lag | 6.56 | a bug in, packet loss latency, <db> psu | 3.31 | issue self resolved, auto throttle, rebalanced balancing | 7.08 |
| sandbox service disruption, <service> failure, edge services | 5.89 | blocks <db> lgwr, wait encounters deadlock, async signal safe | 3.18 | self resolved, high db cpu, active session | 5.09 |
| org migration, intermittent conn pools, <service> shard, mq sfdc | 5.5 | high memory, redo generation, concurrency issue | 3.05 | app tier, rolling restart, restarted apps | 4.89 |
| <service1> <service2> performance degradation, message queue | 5.16 | on the app, conn pool errors, custom lwc component | 3.05 | conn pool, disabled node, was restarted | 4.7 |
| message queue processing, refocus test, thread starvation | 4.15 | logfile switch, writer process waiting, checkpoint incomplete | 2.73 | requests sec, bounced broker, restart of | 4.1 |
| performance degradation connection pool, <name> cloud | 3.57 | all core package, row lock wait, covid vaccine rollout | 2.54 | implemented throttle against org uri pattern | 1.85 |
| app connection pool, service disruption, single server | 3.33 | <db> bug, string list passed, sql uls | 2.42 | site switch from, qlogic bug, failover | 1.59 |
| multiple synthetics test failing on refocus, delayed searchindex | 3.23 | causing conn pool, exhaustion eventbus, integration testing | 2.39 | org mq suspension, async api, kill rule | 1.59 |
| <service> mq lag, asynchronous process delay, | 2.89 | escalated option causing, recovery cycle initiated for many | 2.16 | change case, detection miner, was rolled back | 1.39 |
| mq insights synthetic transactions, <db> bug, studio api high | 2.7 | cpu spike, any scheduled job, sql | 2.1 | release rollback, patch, major | 1.39 |
| synthetics failing, live agent, failures | 2.56 | missing type in the database, level default edition, | 2.03 | <db> service disruption, load balancer, | 1.26 |
| <prod> service network issue, commpods, mq issue sandbox copy platform events | 2.27 | a performance test, guest users, implicit row cause | 1.91 | the message type, running jobs, routing table | 1.19 |
| multiple synthetic tests failure | 1.83 | data lookup, skew scenario, | 1.91 | proxy servers, restarted, dns | 1.12 |
| issues with multiple customers reporting, <name> cloud | 1.74 | caused mq, between user interface, network equipment | 1.72 | core db performance, skinny table, requests | 1.12 |
| multiple customer impacted, mq-pks primary account manager, sfdc sites issue | 1.3 | mq delay, pods have org, its status updated | 1.72 | app, db nodes, cdse shutdown | 1.06 |

*FIG. 11*

| Overlap of Target & Retrieved | Metric | Random Avg | Simple Search | | | Combined Search | | |
|---|---|---|---|---|---|---|---|---|
| | | | Avg | Max | Concat | Avg | Max | Concat |
| | | | (Over Top-10 Results) | | | | | |
| Document | BLEU | 40.93 | 54.17 | 73.02 | 88.1 | 60.61 | 81.38 | 92.01 |
| Subject | BLEU | 3.94 | 42.32 | 61.74 | 74.23 | 21.02 | 53.18 | 70.12 |
| | Recall | 1.22 | 6.31 | 18.18 | 21.71 | 4.64 | 17.14 | 22.31 |
| Topics | BOW Recall | 6.82 | 21.53 | 40.28 | 55.25 | 22.01 | 43.63 | 62.88 |
| Summary | BLEU | 16.73 | 33.35 | 55.98 | 77.27 | 37.62 | 64.59 | 84.61 |
| Root Cause | BLEU | 29.12 | 45.71 | 65.64 | 58.85 | 52.35 | 73.38 | 65.57 |
| | BOW Recall | 2.75 | 5.34 | 19.59 | 31.67 | 5.4 | 20.57 | 31.87 |
| | BLEU | 4.68 | 8.59 | 26.71 | 51.3 | 8.97 | 26.95 | 53.35 |
| Resolution | BOW Recall | 4.08 | 6.14 | 22.7 | 32.86 | 5.11 | 21.67 | 31.57 |
| | BLEU | 5.33 | 8.92 | 28.38 | 51.1 | 7.69 | 27.51 | 50.65 |

*FIG. 12*

| Query | Apt High Degraded Capacity High CPU regressed Week over Week |

<POD>NODE 1 CONNECTION POOL TIME OUT ERROR  May 27, 2020, 9:38:51 AM

The Site Reliability team has resolved degraded performance due to,<Pod>experienced brief connection pool out on node 1 ,

<POD>ASYNCHRONOUS PROCESSING DEGRADATION  Jan 19, 2021, 10:52:45 PM

<Pod>Asynchronous processing degradation, /services /Soap / u/46,0,*, Once the throttle was applied CPU returned to excepted level and message began to process ,

<POD>CONNPOOL  Oct 29, 2019, 1:10:07 PM

High connpool and high APTs during the above mentioned period ,

<POD> CONNECTION POOL TIMEOUTS DUE TO SINGLE ORG ACTIVITIES  Jan 30, 2021, 4:06:47 AM

<Pod> Connection Pool Timeouts due to Single Org activities, The Site Reliability team is investigating a Sev1 incident related to <Pod> Connection Pool Timeouts due to Single Org activities ,

<POD> HIGH APTS AND HIGH DB CPU  Sep 24, 2019, 12:06:18 PM

Initial investigation <Pod> APT looks heightened after the weekend maintenance on <Date> Time UTC to failover to <Pod>db2 - 1-syd from <Pod>db1 - 1-syd and we are exploring reversing this change . The local DB switchover took place from<Time>to<Time>UTC and APT has returned to normal

MESSAGEQUEUE TEST FAILING ON REFOCUS  Feb 21, 2020, 5:01:34 AM

We have asynchronous impact due to high DB CPU on Node 4,

*FIG. 13*

| Distributions with (%) Scores | |
|---|---|
| TOP ROOT CAUSES | |
| Customer induced load resulting in high execution of SQLs ... DB CPU auto throttle | 23.3 |
| A bug that ... consuming High CPU | 20.2 |
| Log file switch checkpoint incomplete ASH ... know issue | 11.9 |
| Customer opened a vaccination appointment ... database contention DbConnPool Errors as Active Request Waits waiting on oracle index | 10.3 |
| 2 sql ids from ORG..null empty string list passed to SOQL | 9.0 |
| The dequeue rate increased to clear message backlog | 6.6 |
| Implicit row cause for Guest users of the nature Person Implicit ... maintenance of guest person implicit shares ... poor performance | 6.6 |
| High memory and SWAP space used by LMS processes ... slows node shutdown brought down by patching job | 5.3 |
| Following SOQL from customer ... run by a single user | 3.4 |
| Huge number of sessions on multiple nodes waiting on gc buffer busy acquire with common blocking session | 2.5 |

| Distributions with (%) Scores | |
|---|---|
| TOP REMEDIATION | |
| suspended message type and killed existing jobs ... | 20.5 |
| Implemented throttle ... services apexrest | 20.3 |
| LDG failover | 17.9 |
| Block aura other buildQueryResult .. mq started clearing | 12.7 |
| Applied auto throttle ... CPU and MQ returned to normal | 9.3 |
| implemented a CSP throttle <OrgID> ... Permits per sec | 8.7 |
| Two throttles added ... rolling restart of App Tier | 8.6 |
| Aborted the oracle instances running to resolve impact | 2.1 |

*FIG. 15*

SYSTEMS AND METHODS FOR ARTIFICIAL INTELLIGENCE-BASED ROOT CAUSE ANALYSIS OF SERVICE INCIDENTS

CROSS REFERENCES

The application is a non-provisional of and claims priority under 35 U.S.C. 119 to U.S. provisional application No. 63/185,167, filed May 6, 2021, which is hereby expressly incorporated by reference herein in its entirety.

TECHNICAL FIELD

The present disclosure relates generally to root cause analysis (RCA) of incidents disrupting information technology services, and more specifically, to artificial intelligence driven RCA systems configured to analyze problem review board (PRB) data of the incidents.

BACKGROUND

Root cause analysis (RCA) refers to methods for identifying root causes of problems or issues that arise in a wide array of fields, including information technology (IT), communications, industrial processes, etc. In IT sectors such as cloud computing, when incidents that disrupt cloud services occur, domain experts that investigate the incidents produce investigative documentations that include so-called problem review board (PRB) data which contain natural language descriptions of the symptoms, summaries, resolutions, root causes, etc., of the incidents. Because the PRB data contains natural language, i.e., unstructured, descriptions that are usually long, the PRB documents may not be convenient to use when investigating future incidents even when the future incidents have symptoms as those described in the PRB documents, resulting in massive inefficiencies.

BRIEF DESCRIPTION OF THE DRAWINGS

FIGS. 6-15 provide example data analytics and performance plots illustrating example performance of the RCA, according to embodiments described herein.

Figure 1:
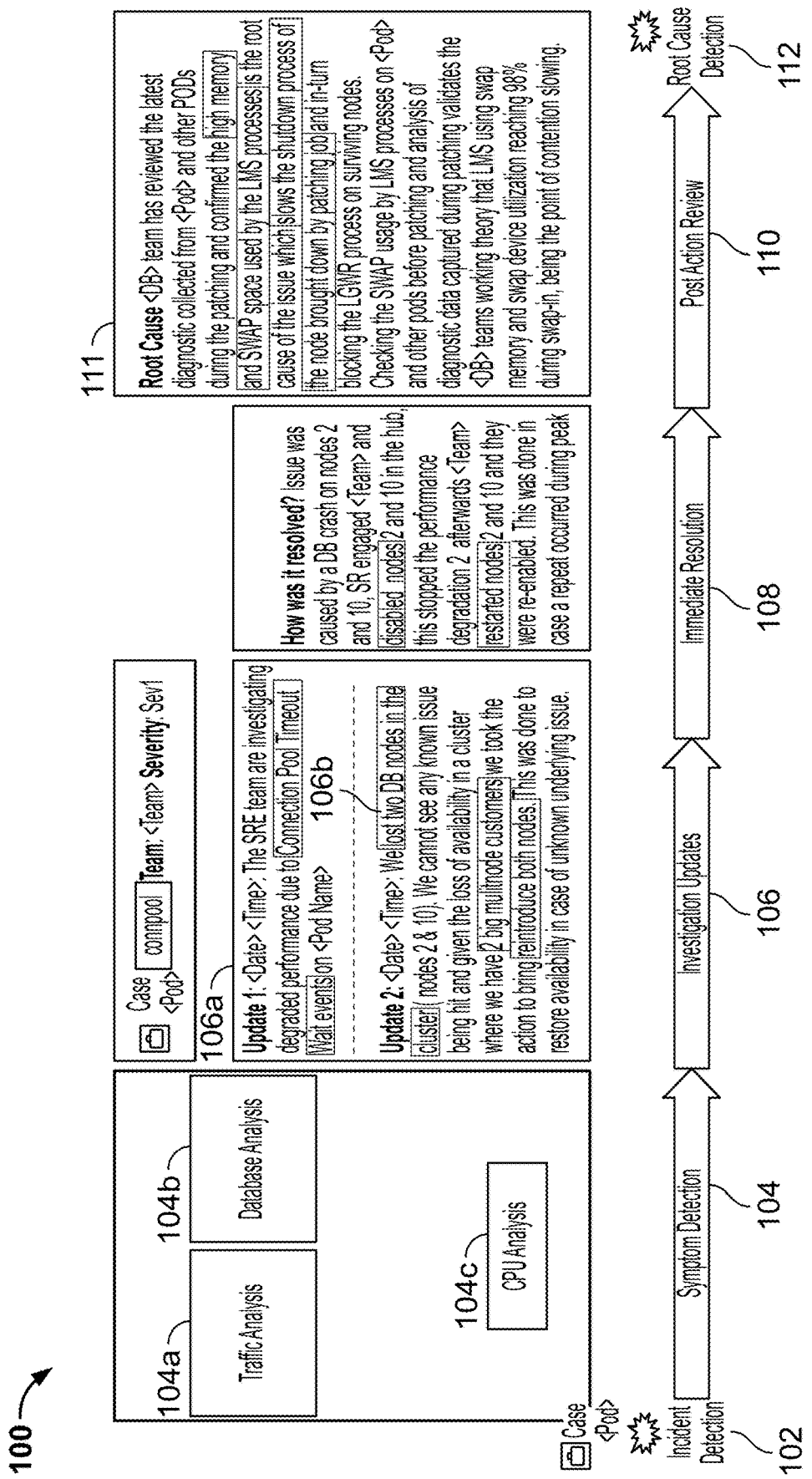
FIG. 1 is a block diagram illustrating an example traditional RCA pipeline with manual investigation and documentation to produce PRB data, according to embodiments described herein.

In the figures and appendix, elements having the same designations have the same or similar functions.

DETAILED DESCRIPTION

When incidents disrupt services or processes in fields such as information technology, domain experts investigate and document the same to generate so-called problem review board (PRB) data that include myriad information about the incidents and the steps taken during the investigations. For example, when a cloud service is disrupted by an incident, domain experts investigating the incident may produce a PRB document including PRB data such as but not limited to the symptom of the incident, investigative updates, resolutions undertaken to address the incident, root causes of the incident, etc. For instance, the investigative updates may be a sequence of timestamped updates describing the contemporaneous status of the incident and attempts to troubleshoot and address the incident. In some cases, the resolutions may not address the root causes of the incident but may be directed to resolving the issue temporarily.

PRB data of previous incidents contain a wealth of knowledge about service disrupting incidents, and as such contain information that can be used to address future incidents, in particular those sharing same or similar symptoms as the incidents investigated and documented in the PRB documents (e.g., repeating incidents). However, because descriptions in PRB documents are usually tediously long and in the form of open-ended, unstructured natural language, the PRB documents of prior incidence investigations may be exceedingly cumbersome to use when investigating a future incident. The difficulty or inability to use PRB data of previous incidents may result in inefficiency and wasted resources, for instance, when having to conduct multiple investigations to identify the root causes of incidents that may be quite similar in nature. As such, there is a need for methods and systems that efficiently process PRB records of previous service disrupting incidents in a field such as cloud services to extract causal information relating symptoms, resolutions, root causes, etc., of the incidents, for example, for use in investigating future service disrupting incidents in cloud services.

Some embodiments of the present disclosure disclose artificial intelligence (AI) models-powered methods and systems for the generation a causal knowledge graph for root cause analysis of incidents disrupting cloud services, and the generation of an incident report of a service disrupting incident based on said causal knowledge graph.

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

In some embodiments, an AI powered incident causation machine uses natural language processing (NLP) models to extract structured information from PRB documents that contain unstructured, open-ended natural language descriptions of incidents that disrupted services in a wide variety of fields such as but not limited to information technology (IT), communications, industrial processes, etc. For example, NLP models may be used to extract structured PRB data from a set of PRB documents that describe investigations conducted to troubleshoot and address cloud service disrupting incidents. The structured PRB data may include a symptom of the incident, investigative key topics of the incident, investigative summary of the incident, immediate (e.g., temporary or for the moment) resolution of the incident, root causes of the incident, etc., and such structured PRB data may be used to generate a document level causal graph having with the symptoms, resolutions, root causes, etc., represented by the nodes of the document level causal graph. In some instances, a clustering algorithm or technique may be employed to aggregate multiple document level causal graphs corresponding to different PRB documents to generate a causal knowledge graph that has a symptom cluster representing symptoms of incidents described in the set of PRB documents, a root cause cluster representing root causes of incidents described in the set of PRB documents, and a resolution cluster representing resolutions of incidents described in the set of PRB documents, where the causal knowledge graph causally relates the symptom cluster, the root cause cluster, and the resolution cluster.

Specifically, an Incident Causation Mining (ICM) engine is built over past Incident Investigations data and constituting of a pipeline of a Targeted Neural Information Extraction system to extract key information from individual unstructured PRB Documents. A specialized neural knowledge mining system is provided to aggregate document-level information over all incidents into a globally unified, domain-specific, structured causal knowledge graph. In addition, ICM is applied for downstream tasks of Incident Search and RCA in AIOps, i.e., given a new incident symptom, through a neural information retrieval system to find the relevant past incidents by searching over past incident PRB data.

In one embodiment, the domain-specific problem may be solved in an unsupervised setting, using generic pretrained or unsupervised NLP models. The AI pipeline described herein may be generic to process such incident management data in addition to cloud services.

RCA Framework

FIG. 1 is a block diagram illustrating an example traditional RCA pipeline with manual investigation and documentation to produce PRB data, according to embodiments described herein. At cloud industry level with services hosted over thousands of machines, any unprecedented incident greatly affects customer satisfaction and business revenue. Hence automating a pipeline of RCA is essential in order to proactively detect any disruptive incident, analyze its root cause and promptly resolve it.

Traditionally, manual RCA process of cloud service incidents and its documentation in form of PRBs may be conducted as shown at diagram 100. The process starts at the Incident Detection 102, which typically relies on the analysis of various Key Performance Indices (e.g., Average Page Time or APT of a cloud service). On detecting any such disruptive incident on a specific pod or host machine, the manual RCA pipeline starts with Symptom Detection 104. For example, based on manual analysis of different performance factors such as CPU analysis 104c, Host Traffic analysis 104a, DataBase analysis 104b or MessageQueue status, and/or the like, and/or rule-based logic and domain knowledge, the incident symptom is detected, e.g., "Connection Pool timeout issue" or "MessageQueue lag for async process."

The investigation updates 106 occurs after the symptom detection 104. For example, an open-ended investigation is launched to understand the broad nature of the issue and the target team to investigate into the root cause. However, this investigation itself may not be able to identify the root cause. Typically, it is documented as sequence of timestamped updates, each capturing the current status of troubleshooting undertaken, e.g., update 1 106a and update 2 106b.

Immediate Resolution 108 is usually performed based on the conclusions of the investigation 106. An action is taken to at least temporarily resolve the problem. For example, an anomaly of high memory consumption observed in a DataBase node may be mitigated by restarting the node, but a deeper investigation needs to be carried out by the database team to understand the root cause of this issue.

Post Action Review 110 may occur when the target team for RCA is decided. The target team may carry out a post-action review phase to investigate into the possible root cause of the problem. Typically, the entire investigation is documented in any open-ended form of ad-hoc evidence pointing towards the root cause. For example, the root cause shown at document 111 was "the high memory and swap space used by LMS processes," which is documented as unstructured PRB data. After the post action review 110 is done, the root cause detection 112 may be considered complete.

As shown in FIG. 1, the large amount of PRB documentation generated from the manual investigation process, and the raw unstructured nature of PRBs, may not render such root cause knowledge to be directly reusable by manual or automated pipelines for RCA of new incidents. For example, an example raw PRB dataset shown in FIG. 6 may be collected over 1715 cloud service incident investigations, for 3 years, restricting to only major incidents having Sev0/1/2 severity levels, i.e., Catastrophic, Critical or High Impact. The statistics of the original PRB documents as well as the extracted information is shown in FIG. 6. In other words, when a new incident is detected, the RCA analysis would often need to repeat the processes 102-112 to identify the root cause, which largely compromise the system efficiency.

Specifically, the traditional RCA pipeline is heavily reliant on manual or automated investigation using Service Health Monitoring tools or data-sources like application or error logs, execution traces and time series data of KPI metrics. However, discovering any root-cause related signal in these data-sources can be a complex time-consuming task. On the other hand, the past incident investigations documented by do-main experts are a rich goldmine of Oracle Root Cause Information, containing many explicit informative linguistic cues connecting the incident symptom to the detected root cause and recommended resolution. However, in its raw form, such long, unstructured natural language documentations are not apt for knowledge reuse. Consequently, in practice, traditional Incident Management has not automated curation and reuse of such knowledge. But, with the advancement of pretrained neural models for domain-specific NLP, such unstructured PRB data can be processed into a structured form amenable to knowledge reuse in downstream RCA. In a futuristic multimodal multi-source RCA engine, the extracted root causes can act as Oracle and the corresponding candidate predictions from such PRB based RCA engine can add rich feature information.

On the other hand, an incident is repeated if it has similar symptom, root cause and resolution as any past incident. For example, the extent of repetition may be qualitatively defined as the maximum obtainable Word-Overlap of the concatenation of these three fields, when compared with all past incidents. Historical data shows that over a timeline of few years, the quarterly count of all and various degrees of repeating incidents, showing that the latter consistently persists throughout the period. The distribution of incident severity is quite similar across repeating and non-repeating incidents, thus indicating that repeating incidents typically need as much attention as the non-repeating ones. The distribution of the incident resolution time may also be quite similar across repeating and non-repeating incidents, due to the lack of a framework to reuse knowledge from past investigations. Especially with many high-stake recurring incidents, AI-driven pipelines become essential to extract and represent the RCA knowledge embedded in PRBs.

Because of the decentralized documentation involving various teams and the agile troubleshooting and triaging framework, creating the PRB data in a structured form may not be practical, or even feasible. In fact, such added responsibility of linguistically expressing the incident and investigation outcomes in a crisp structured manner can also make the overall documentation process cumbersome and non-intuitive, especially with the evolving nature of incidents and root-causes. In view of the challenge, a retrieval-based RCA pipeline that automates the process using PRB is described in FIG. 2.

Figure 2:
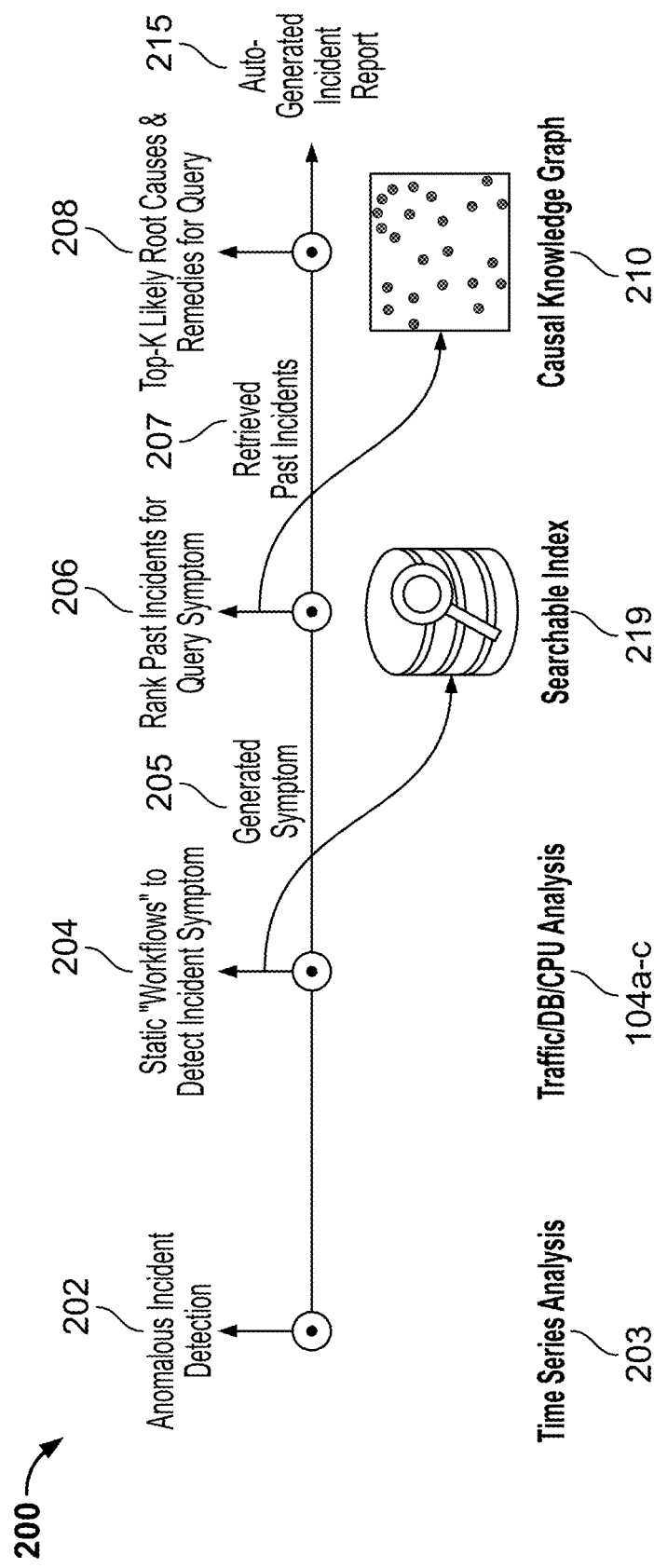
FIG. 2 is a block diagram illustrating a retrieval-based RCA pipeline 200 using PRB, according to embodiments described herein.

FIG. 2 is a block diagram illustrating a retrieval-based RCA pipeline 200 using PRB, according to embodiments described herein. In view of a lack of automated RCA pipeline that streamlines the RCA process, an AI-driven pipeline 200 of ICM to extract crisp causal information from the unstructured PRB documents (e.g., the highlighted snippets in FIG. 1) and construct a causal knowledge graph from incident symptoms, root causes and resolutions. The pipeline 200 includes neural natural language processing, information extraction and knowledge mining components. The core of ICM uses rich distributional semantics of natural language to compactly represent prior knowledge and efficiently retrieve and reuse the appropriate information from them to avoid the cold-start problem when investigating repeating or similar issues.

Specifically, anomaly incident detection 202 may be performed through various multivariate time-series analysis 203 of the key performance indices (e.g., APT). At stage 204, different hand-crafted static workflows may be auto-triggered to analyze related performance metrics via traffic/database/CPU analysis 104a-c, targeted at detecting the incident symptom 205. The generated symptom 205 is then sent to a searchable index database 219 as input query for searching the past incidents with the detected symptom description.

For example, at stage 206, past incidents from the database 219 may be ranked based on the query symptom. The returned past incidents 207 in response to the generated query symptom 205 may then be used to construct a causal knowledge graph 210.

At stage 208, the most likely (e.g., the top-K with K being a configurable integer) root causes and remedial actions may be detected associated with the query symptom 205, based on the con-structed Causal Knowledge Graph 210. An incident report 215 can thus be automatically generated from the identified root causes and remedial actions.

In this way, the infrastructure of the auto-pipeline 200 may yield a holistic RCA engine over multimodal multi-source data like log data, memory dumps, execution traces and time series. By unifying the causal knowledge from multiple data sources, the pipeline 200 thus can yield a richer incident representation and model cross-modal causality to potentially discover unknown root causes.

Figure 3:
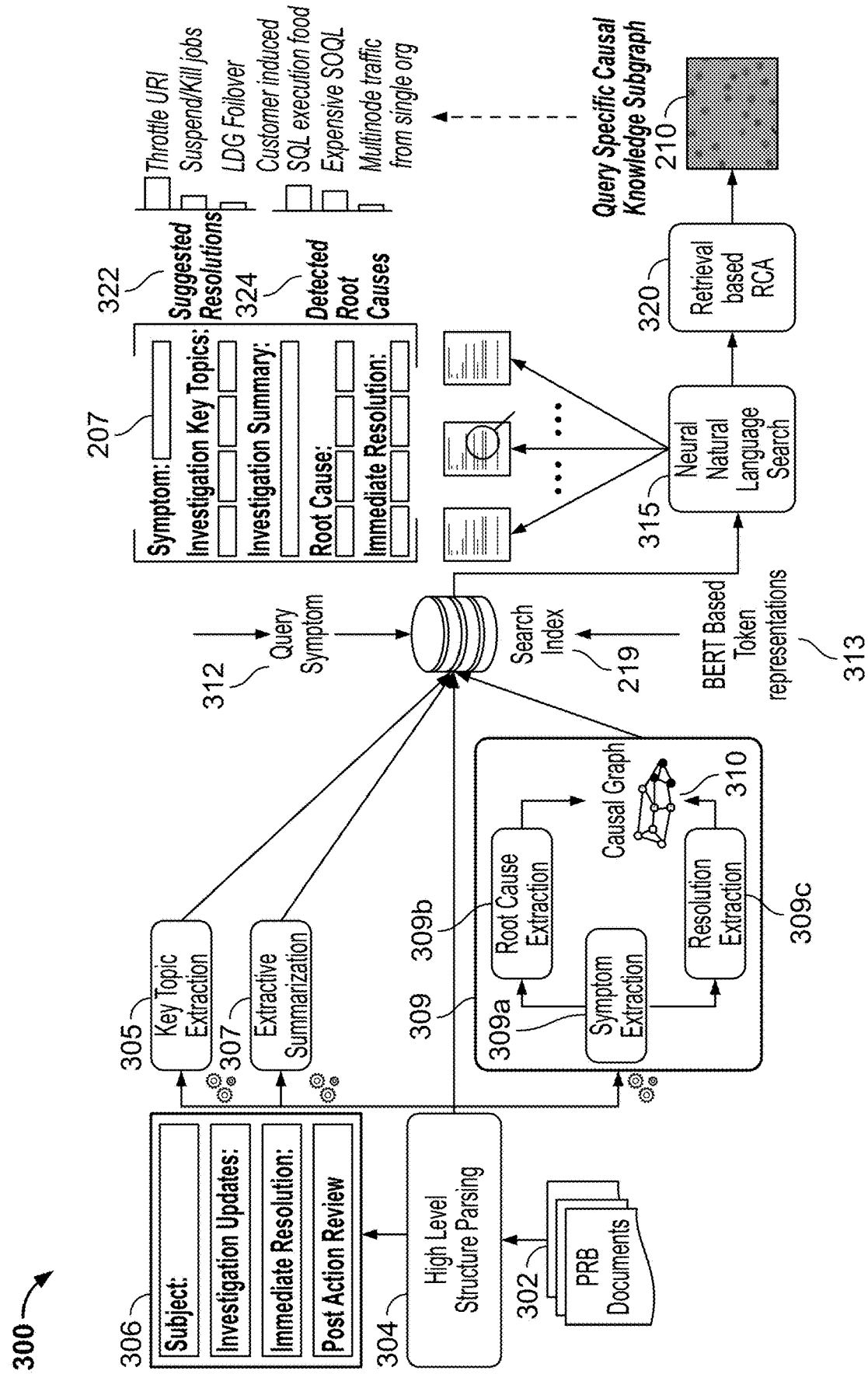
FIG. 3 provides an example block diagram illustrating a framework for incident causation mining pipeline with downstream incident search and retrieval-based RCA over PRB data, according to one embodiment described herein.

FIG. 3 provides an example block diagram 300 illustrating a framework for incident causation mining pipeline with downstream incident search and retrieval-based RCA over PRB data, according to one embodiment described herein. Diagram 400 shows the ICM pipeline over the repository of PRB documents, serving as an isolated Incident Search tool specialized for RCA. An example use case starting with detection of an ongoing incident and its symptom through time-series analysis and rule-based workflows. This auto-triggers the Incident Search and Retrieval based RCA for the query symptom and outputs an auto-generated Incident Report consisting of i) detected symptom ii) relevant past incidents matching the symptom iii) distribution of the most likely root causes and remedial actions to temporarily resolve the issue. In some embodiments, an incident report may be generated for the anomalous incident listing some or all of the retrieved root causes as the root causes of the anomalous incident.

In diagram 300, a raw PRB document 302 may record the incident investigation having a structure comprising: i) incident subject, i.e., a crisp title which typically captures the initial symptom of the incident, ii) incident timestamp and machine/host details, iii) sequence of periodic updates of the investigation, iv) immediate resolution and v) post action review. The raw PRB documents 302 may be passed through high level structure parsing at 304 to result in a structured format 306. An example raw PRB document 302 (left) and the structured form 306 (right) are shown in FIG. 7.

The parsed structured PRB documents 306 may be sent for various extraction tasks. For example, the key topic extraction module 305 may employ an ensemble of various unsupervised Topic models to extract short crisp phrases or topics that are most central/representative to the full document. Example topic models may include Graphical Topic Models: TextRank (described in Mihalcea et al., TextRank: Bringing Order into Text. In Proceedings of the 2004 Conference on Empirical Methods in Natural Language Processing. Association for Computational Linguistics, Barcelona, Spain, 404-411), SingleRank (described in Wan et al., CollabRank: Towards a Collaborative Approach to Single-Document Keyphrase Extraction, in Proceedings of the 22nd International Conference on Computational Linguistics (Coling 2008), Manchester, UK, 969-976), TopicRank (described in Bougouin et al., TopicRank: Graph-Based Topic Ranking for Keyphrase Extraction, in Proceedings of the Sixth Inter-national Joint Conference on Natural Language Processing. Asian Federation of Natural Language Processing, Nagoya, Japan, 543-551), Topical-PageRank (described in Sterckx et al., Topical Word Importance for Fast Keyphrase Extraction, in Proceedings of the 24th International Conference on World Wide Web (Florence, Italy) (WWW '15 Companion), 121-122), Position-Rank (described in Florescu et al., PositionRank: An Unsupervised Approach to Keyphrase Extraction from Scholarly Documents. In Proceedings of the 55th Annual Meeting of the Association for Computational Linguistics (Volume 1: Long Papers). Association for Computational Linguistics, Vancouver, Canada, 1105-1115), MultipartiteRank (described in Boudin et al., Unsupervised Keyphrase Extraction with Multipartite Graphs. In Proceedings of the 2018 Conference of the North American Chapter of the Association for Computational Linguistics: Human Language Technologies, Volume 2 (Short Papers). Association for Computational Linguistics, New Orleans, Louisiana, 667-672), Feature based Model like YAKE (described in Campos et al., YAKE! Keyword extraction from single documents using multiple local features. Information Sciences 509 (2020), 257-289), Embedding based approaches SIFRank (Sun et al., SIFRank: A New Baseline for Unsupervised Keyphrase Extraction Based on Pre-Trained Language Model. IEEE Access 8 (2020), 10896-10906), which represents sentences using pretrained neural model ELMO (described in Peters et al., Deep contextualized word representations. In Proc. of NAACL, 2018). Each of them extracts topical phrases along with a normalized probability scores, which are simply aggregated into a distribution by the ensembling technique.

The extractive summarization module 307 may extract the most informative sentences as summary, using an ensemble of two models i) a RoBERTa (Liu et al., RoBERTa: A Robustly Optimized BERT Pretraining Approach. http://arxiv.org/abs/1907.11692 cite arxiv:1907.11692) based extractive summarization model finetuned on standard benchmark summarization dataset, CNN-DailyMail (Nallapati et al., Abstractive Text Summarization using Sequence-to-sequence RNNs and Beyond, in Proceedings of The 20th SIGNLL Conference on Computational Natural Language Learning. Association for Computational Linguistics, Berlin, Germany, 280-290); and ii) Clustering sentence based on their dense vector representation obtained by averaging the pretrained BERT based token embeddings. By selecting a subset of clusters, extractive summaries of controllable granularity may be constructed based on an additional constraint of summary length. The ensembling technique here simply uses these two models to generate a default, short as well as a more detailed version of the summary, in order to promote better readability to its users.

A rule-based symptom extraction module 309a may extract the generic symptom indicating the incident (e.g., connpool) from the PRB Subject, by removing specific Host Machine details. At inference time, symptom is detected for new incidents through automated workflows for analyzing key metrics (e.g., CPU or DB).

A root cause extraction module 309b may extract crisp root causes from long descriptive Post Action Review fields, the span-extraction needs to be tailored, targeting only causal spans. The popular task of Machine Reading Comprehension has a similar objective, i.e., Question Answering (QA) based on a given passage—where pretrained neural Transformer models have proven particularly successful. Thus, an ensemble of SoTA models like variants of BERT (e.g., DistilBERT (Sanh et al., DistilBERT, a distilled version of BERT: smaller, faster, cheaper and lighter. ArXiv abs/1910.01108, 2019), BERT-base and BERTlarge), RoBERTa and SpanBERT (Joshi et al., SpanBERT: Improving Pre-training by Representing and Predicting Spans. Transactions of the Association for Computational Linguistics 8 (2020), 64-77), each of them fine-tuned on the standard open-domain extractive-QA datasets SQuAD (Rajpurkar et al., SQuAD: 100,000+ Questions for Machine Comprehension of Text, in Proceedings of the 2016 Conference on Empirical Methods in Natural Language Processing. Association for Computational Linguistics, Austin, Texas, 2383-2392). For each of these models, a hand-crafted collection of natural language queries seeking the root cause of the incident, e.g., What was the root cause of <SYMPTOM>? or What caused the incident?, where <SYMPTOM> refers to the extracted incident symptom. Each of these models may extract short spans as answers along with a probability score which are then simply aggregated by the ensemble into a span-set after applying lexical de-duplication. The ensembling also enables multi-span extraction—an important characteristic as the documentation can arbitrarily mention multiple valid root causes.

A resolution extraction module 309c may be adopted, which is similar to root-cause extraction module 309b but applied on Immediate Resolution field of PRB documents. The same ensemble of pretrained QA models with a handcrafted set of paraphrased questions targeted at extracting the immediate action that was taken to resolve the issue, e.g., What was done to remedy the <SYMPTOM>? or What action resolved the incident?

In one embodiment, for each of these multi-span extraction tasks, various post-processing strategies are applied to avoid repetitive or degenerate and uninteresting candidates. The spans extracted by the span extraction models (Topic, Root Cause and Resolution) are simply aggregated based on their probability scores by the ensemble. The resulting spans are further refined by merging significantly overlapping or even short co-located spans, additively aggregating their respective scores. Any resulting short span is replaced by the clausal phrase containing it, obtained from the dependency parsing of the corresponding sentence. This is done by consecutively adding the parent and children (from the parse tree) tokens of the span, till it reaches a sufficient length. This leads to self-explanatory topical phrases that are still short and crisp. Finally, for each of these information extractions, greedy selection techniques are applied to obtain a lexically diverse subset.

In one embodiment, the document-level information extracted in form of symptoms, root causes and resolutions from modules 309a-c are used to create an unified Causal Knowledge Graph 310. For example, this curated structured knowledge is used to enable an extensive but compact visualization of the extracted information and the underlying global causal structure. Further details of generating the causal graph 310 may be provided in FIG. 5.

The generated document level information from modules 305, 307, 309 (including 309a-c) may then be sent to search index database 219. When a new incident occurs, a core Incident Management task is to efficiently search over the past related incidents and promptly detect the likely root causes based on the past similar investigations. Hence, a specialized Neural Search and Retrieval system 315 is built over PRB data, that support any open-ended Natural Language Query. Neural search functions by representing documents as dense, high-dimensional real-valued vectors and constructing a searchable index over these representations, which will allow fast retrieval of the most relevant documents for any open-ended query. Large-scale pretrained neural language models make it possible to represent general linguistic semantics and match domain specific text even without any in-domain training. To construct such a search index, the Subject and Investigation document of each PRB record are combined and segment it into sentences. Each sentence is represented by a dense vector obtained as a simple average of pretrained RoBERTa based token embedding representation 313. Next a sentence-level searchable index is constructed with each sentence of every PRB record being an index item. Based on this index, Incident Search and Retrieval based RCA can be conducted.

In one embodiment, for short phrasal or single-sentence queries with query symptoms 312, the query representation 313 is computed as above, taking average of RoBERTa based token-embeddings. For multi-sentence queries, each query sentence is separately searched, and their result sets are aggregated to get the final Top-K results.

The neural natural language search system 315 retrieves the most relevant sentences over all PRB Documents, scoring them with respect to query based on standard vector similarity metrics (e.g., cosine). These normalized sentence-level scores are aggregated at document level to get the overall score of the top-K retrieved PRBs. The retrieved PRB documents are then shown in an easily consumable, user-friendly structured form 207 of the extracted information: Investigation Subject, Topics, Summaries of different granularity, Root Cause and Resolution.

The extracted root causes from each of the top-K retrieved PRB documents are collated to construct a compact distribution, based on the following steps. First, the multiple extracted spans from neighboring sentences are merged into a comprehensive sentence-form description of the root cause. Correspondingly, the individual span scores are max-pooled, yielding a consolidated root cause score. Then, the root cause score is multiplicatively combined with the PRB document's ranking score. Next, simple deduplication techniques are applied to merge lexically near-identical root causes across multiple search results and aggregating the corresponding scores. The scores are L1-normalized to obtain a distribution over the possible root causes associated to the given query. A distribution of remedial actions mined from top-K retrieved incidents is generated.

Thus, the retrieval-based RCA may generate a query specific causal knowledge subgraph 210, which gives an interactive visualization of subgraph over the symptoms, root causes and resolutions associated with the top-K retrieved search results. With this, users can get an extensive global view of the causal structure underlying the past similar incidents and arbitrarily navigate to other related nodes in the overall graph. For example, the subgraph 210 may be used to generate an output of a distribution of the suggested resolutions 322 and the detected root causes 324.

RCA Workflows

Figure 4:
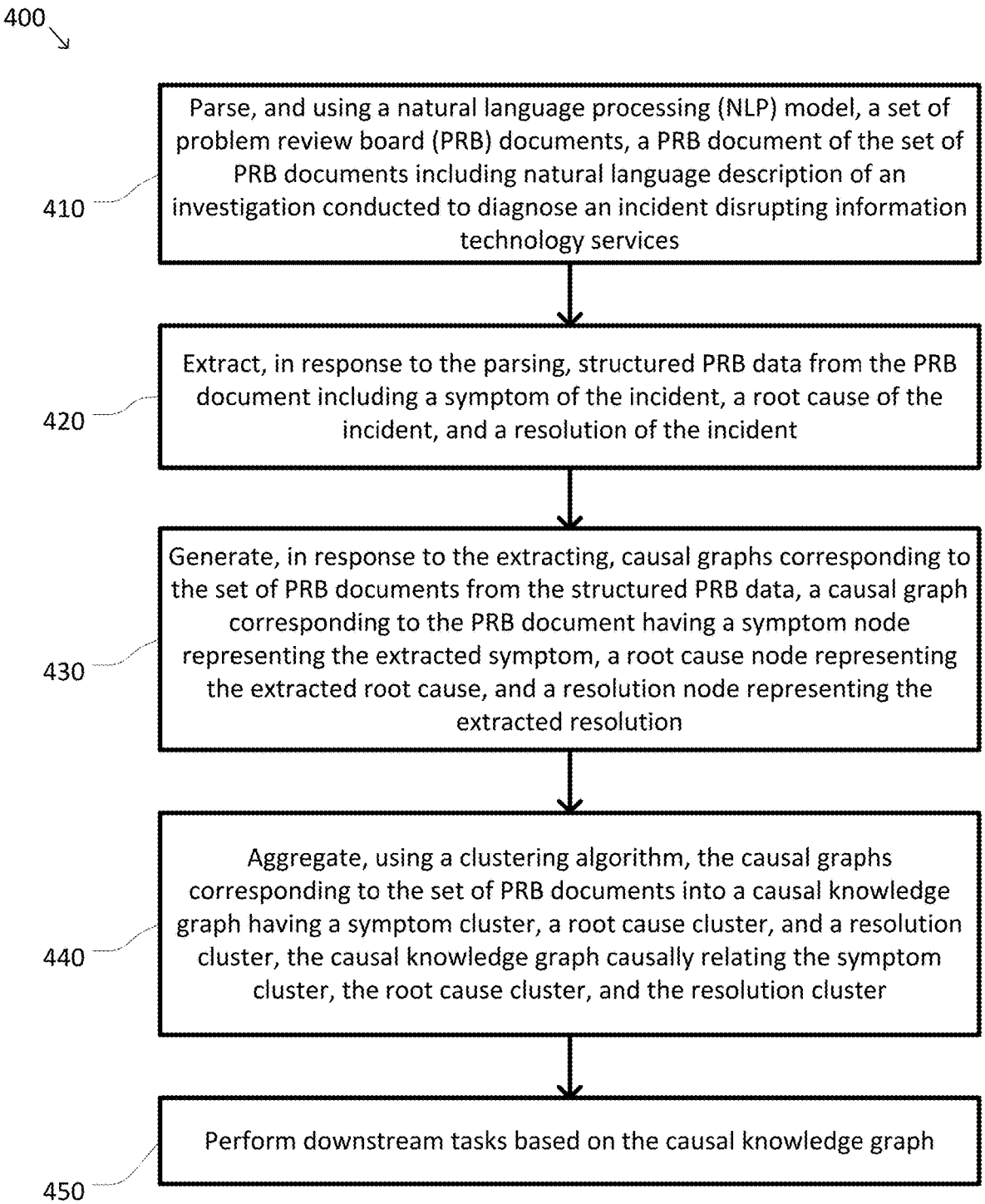
FIG. 4 is a simplified diagram of a method for generating a causal knowledge graph, according to some embodiments.

FIG. 4 is a simplified diagram of a method 400 for generating a causal knowledge graph, according to some embodiments. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of RCA module 130 (FIG. 1) to perform the task of generating the causal knowledge graph for root cause analysis. As illustrated, the method 400 includes a number of enumerated steps, but aspects of the method 400 may include additional steps before, after, and in between the enumerated steps. In some respects, one or more of the enumerated steps may be omitted or performed in a different order.

At process 410, the RCA module 130 may parse, via a processor (e.g., processor 110) and using a natural language processing (NLP) model, a set of problem review board (PRB) documents. In some instances, a PRB document of the set of PRB documents may include natural language description of an investigation conducted to diagnose an incident disrupting information technology service.

At process 420, the RCA module 130 may extract, in response to the parsing, structured PRB data from the PRB document including a symptom of the incident, a root cause of the incident, and a resolution of the incident.

At process 430, the RCA module 130 may generate, via the processor and in response to the extracting, causal graphs corresponding to the set of PRB documents from the structured PRB data. In some instances, a causal graph may correspond to the PRB document having a symptom node that represent the extracted symptom, a root cause node that represent the extracted root cause, and a resolution node that represent the extracted resolution. For example, the causal graph is constructed over the extracted symptom, root cause and resolution as nodes, with edges added from the root cause and resolution node to the symptom node. Node descriptions are represented as average of the GloVe (Pennington et al., GloVe: Global Vectors for Word Representation. In Proceedings of the 2014 Conference on Empirical Methods in Natural Language Processing (EMNLP). Association for Computational Linguistics, Doha, Qatar, 1532-1543) based token embeddings, weighted by normalized term-frequency. Empirically, GloVe based static word representations led to more distinctive clusters, while clusters formed out of contextual BERT or RoBERTa embeddings lacked clear separation.

At process 440, the RCA module 130 may aggregate, via the processor and using a clustering algorithm, the causal graphs corresponding to the set of PRB documents into a causal knowledge graph. In some instances, the causal knowledge graph may have a symptom cluster representing symptoms of incidents described in the set of PRB documents, a root cause cluster representing root causes of incidents described in the set of PRB documents, and a resolution cluster representing resolutions of incidents described in the set of PRB documents. Further, in some instances, the causal knowledge graph may causally relate the symptom cluster, the root cause cluster, and the resolution cluster.

At process 450, the RCA module 130 may perform downstream tasks based on the casual knowledge graph. For example, as shown in FIG. 3, the causal graph 310 may be used to perform downstream tasks such as Throttle URI, Suspend/Kill jobs, LDG Foilover, etc.

Figure 5:
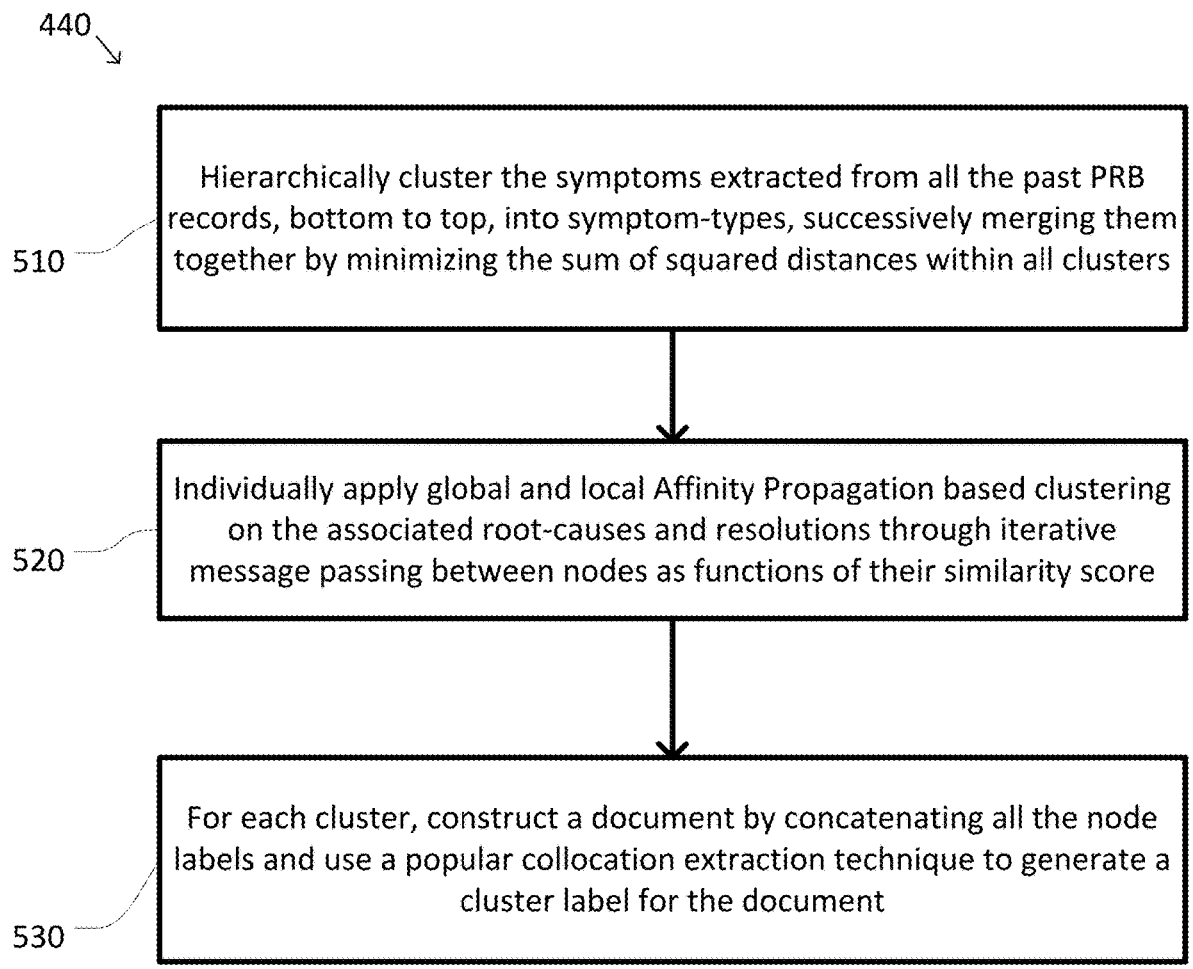
FIG. 5 is a simplified diagram of a method further detailing the step aggregating causal graphs into a causal knowledge graph, according to some embodiments.

FIG. 5 is a simplified diagram of a method further detailing the step aggregating causal graphs into a causal knowledge graph 440, according to some embodiments. One or more of the processes of method 440 may be implemented, at least in part, in the form of executable code stored on non-transitory, tangible, machine-readable media that when run by one or more processors may cause the one or more processors to perform one or more of the processes. In some embodiments, method 440 corresponds to the operation of RCA module 130 (FIG. 1) to perform the task of generating the causal knowledge graph for root cause analysis. As illustrated, the method 440 includes a number of enumerated steps, but aspects of the method 440 may include additional steps before, after, and in between the enumerated steps. In some respects, one or more of the enumerated steps may be omitted or performed in a different order.

In one embodiment, process 440 may be implemented with clustering strategies over the dense representation of the graph nodes to aggregate the incident level in-formation into a compact causal knowledge graph. Each cluster is represented by creating an additional node and adding edges from it to every node in the cluster.

Specifically, at step 510, the symptoms extracted from all the past PRB records may be hierarchically clustered, bottom to top, into symptom-types, successively merging them together by minimizing the sum of squared distances within all clusters. Since these clustering techniques require the number of clusters as input, example clustering methods like ELBOW and Silhouette (Yuan et al., Research on K-Value Selection Method of K-Means Clustering Algorithm. J 2, 2 (2019), 226-235) may be used to estimate the number of clusters.

At step 520, root causes and resolutions may be clustered by individually applying global and local affinity propagation (Pedregosa et al., Scikit-learn: Machine Learning in Python. Journal of Machine Learning Research 12 (2011), 2825-2830) based clustering on the associated root-causes and resolutions through iterative message passing between nodes as functions of their similarity score. Here global refers to clustering all root-causes (and resolutions) collected from all the past PRB records and local clustering is only restricted to the root-causes (and resolutions) associated to symptoms within each cluster of symptom-type.

At step 530, labeling is clustered by constructing, for each cluster, a document by concatenating all the node labels and using a collocation extraction technique (Petrovic et al., Comparison of collocation extraction measures for document indexing, in 28th International Conference on Information Technology Interfaces, 2006. 451-456) on it. It greedily selects the longest n (<=3)-grams having highest Pointwise-Mutual Information or Likelihood Ratio from the document. The selected n-grams are further reranked using average normalized term-frequencies of the non-stop words, which is found particularly helpful in short-text labeling. Finally, like in the previous span-extraction post-processing steps, the selected n-grams are refined with greedy strategies to obtain a lexically diverse subset, which is treated as the final cluster label. With the repository of all past incidents represented compactly in this structured form by the ICM engine, the downstream tasks may be implemented, leveraging ICM towards the final goal of RCA.

Example Performance

The modules of the ICM pipeline and the downstream Incident Search and RCA task may be evaluated over in-house collected PRB dataset of past 1715 incidents. The evaluation results through quantitative benchmarking and qualitative analysis along with expert-annotated validation of the model predictions and finally also illustrate a motivating case study of a real incident.

For example, targeted information is extracted from PRB in a completely unsupervised setting, with no human-annotated evaluation set even for quantitative benchmarking. Example PRB data gathered over 3 years may be shown in FIG. 6. A survey is conducted over domain experts (site reliability engineers and target end-users), to validate and annotate the extracted topics, summaries and root causes and present the quantitative stats in Table 2 of FIG. 8.

For instance, 1320 topics are selected over all PRB documents, sampling uniformly from the topic score distribution. On this, annotators were asked to provide following (binary) labels: i) Grammatically Well-formed (may not be informative) ii) Sufficiently Informative iii) Clarity in Meaning iv) Too Generic or Uninteresting iv) Has extra irrelevant words. As the results show, most of the topics are well-formed and around 76% are found to be informative and useful. Summary: the default and detailed summary of 265 PRB documents are taken and ask the annotators to provide the following binary labels i) Satisfactorily Informative ii) Too Specific (i.e., has additional irrelevant sentences) iii) Too Generic (e.g., does not have any information about the outcome of the investigation). However, sometimes, the summary is too generic due to the original PRB document being incomplete. Despite that, around 83% of summaries are found to be informative with appropriate level of detailing. Root Cause and Resolutions: the annotators are provided with randomly sampled 320 Post Action Review documents and 175 PRB Resolution documents, respectively with their extracted root cause and resolution spans highlighted in them. The annotator is asked to freely modify or delete any span that is found to be not grammatically well-formed or incorrect as the root cause or resolution. The annotator can also independently add other spans deemed to be correct. The overall results show that the unsupervised models indeed perform remarkably well. 79% of the predicted root-cause and 70% of resolution spans are found to be exactly correct and the (micro) average F1-Score of the predicted and annotated spans (in terms of Bag of Words or Non-Stop Words) is around 88% and 81% respectively for root causes and resolutions.

FIG. 9 illustrates a few examples of the root cause and remedial actions respectively extracted from the raw Post Action Review and Immediate Resolution data field of various past incidents. Some of the salient observations about the model predictions are i) the unsupervised QA models are able to extract relevant root cause or resolution spans, despite the long unstructured nature of the document having abundant unseen technical jargon ii) the model does not show any undesirable stark bias towards passage location in span selection iii) the selected spans are well-formed crisp phrases that are short yet self-explanatory. In fact, this performance is particularly appreciable as the use case only targets "cause/effect" seeking questions that rarely occur in the pretraining QA datasets.

In one embodiment, for clustering, unique descriptions of 867 symptoms, 1261 root causes and 1473 resolutions are extracted over all PRB documents. Some of the salient observations about the clustering are the symptom clustering is possibly most important as it forms the core of the Causal Knowledge Graph and defines the local clustering of root causes and resolutions within each symptom cluster. FIG. 11 shows that the symptom clusters are indeed very well separated and reasonably sized. The root cause and resolution sentence descriptions obtained by merging co-located spans are usually longer and more challenging to cluster. Despite that, even simple affinity propagation techniques led to well-separated clusters, especially without any prior knowledge of the number of clusters. Resolution clustering led to skewed cluster sizes, the large clusters indeed corresponding to some standard best-practice remedies (e.g., node restarting) that apply for diverse incident types.

Figure 10A:
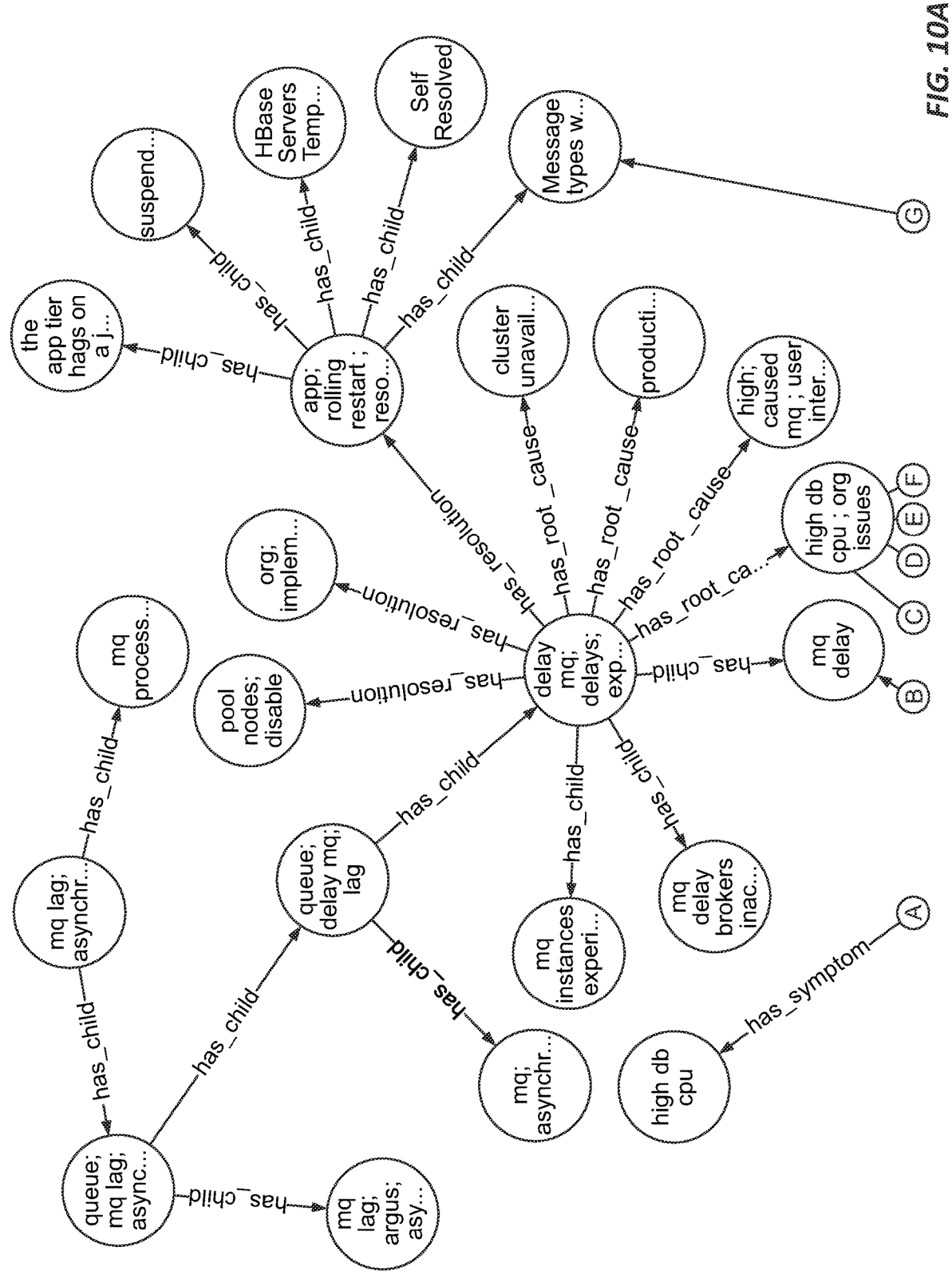
Figure 10B:
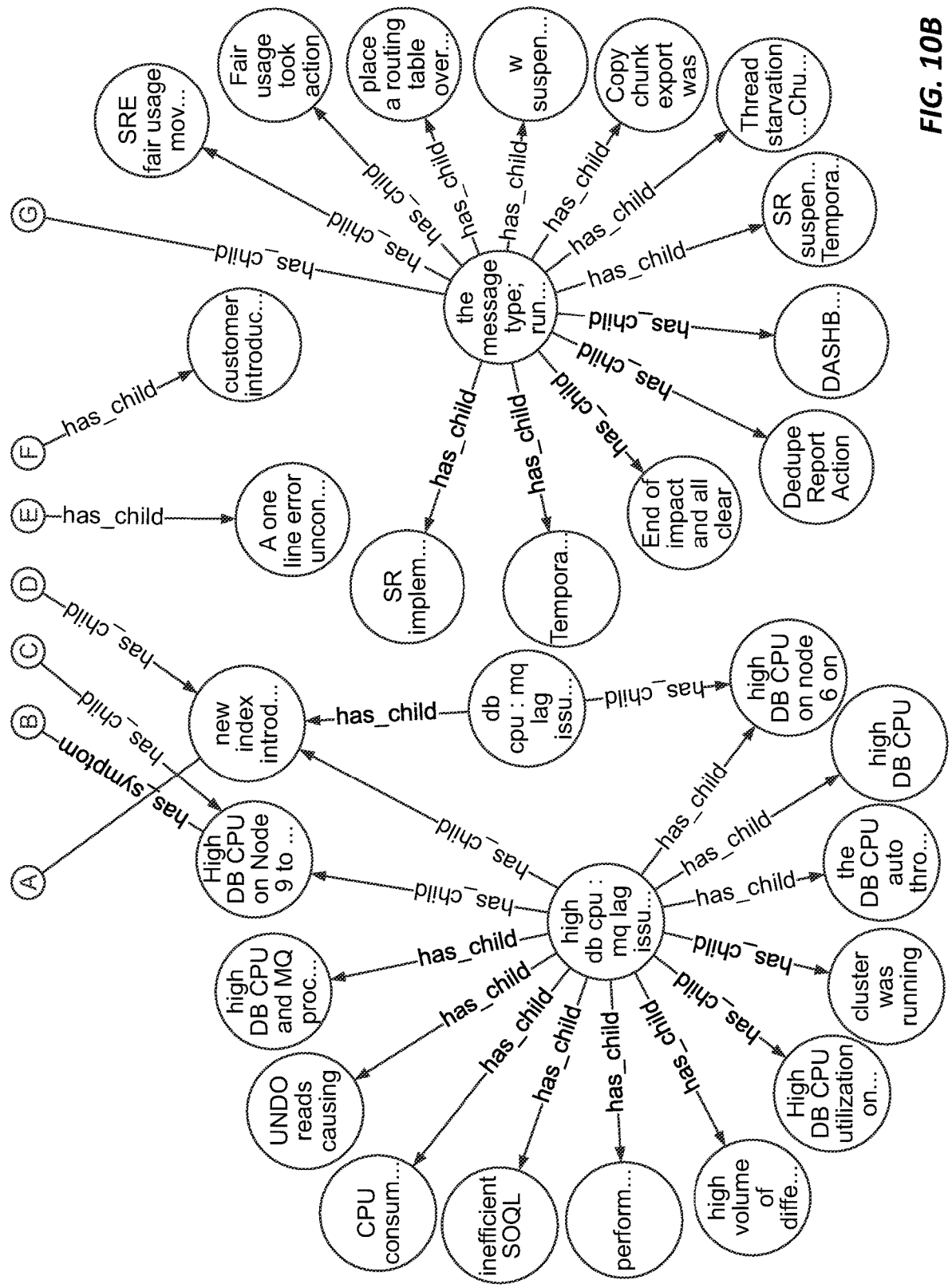

The constructed causal knowledge graph is stored in the popular GraphDB framework. FIGS. 10A and 10B present snapshots of a randomly selected subgraph, showing the following different kinds of nodes, each with label as the corresponding textual description extracted from the PRB document or the generated cluster label. FIG. 10B is a continuation of FIG. 10A. symptomType refers to a symptom-cluster with possible children as another symptomType or symptom or rootCauseType or resolutionType (i.e., respective local clusters within symptom cluster) symptom node with attribute as list of associated incidents. rootCauseType and resolutionType which are the local cluster of root causes and resolutions within a symptom cluster with possible children of type rootCause and resolution respectively globalRootCauseType and globalResolutionType which are the corresponding global cluster over all incidents, with children of type rootCause and resolution nodes rootCause and resolution nodes with attribute as the list of associated incidents and connections to those symptom nodes.

The hierarchical organization of symptoms allows for a more com-pact representation of the clusters at different levels of granularity. The overall graphical form allows quick and intuitive navigation, with the generated cluster labels further rendering the graph traversal more user-friendly. Starting from a symptom type, the user can explore its local cluster of associated root causes or resolutions or other similar types of related symptoms. It also allows the user to drill down a specific root cause cluster to its actual root causes and their corresponding incident symptoms or resolutions. Or one can get a more extensive view of the global root cause cluster and observe how similar root causes have occurred with semantically different symptoms (or resolutions) belonging to different clusters.

Such a Causal Knowledge Graph also helps in post-mortem analysis of incidents, to get a broader understanding of the most recurring symptoms and the common root causes or the best resolution practices. FIG. 11 (left) shows an analysis capturing the most frequently occurring clusters of symptoms, root causes and resolutions, along with the percentage coverage of incidents. This also illustrates the quality of the semantic labeling of clusters, i.e., the generated labels for the leaf-level symptom clusters and global clusters of root causes and resolutions. Even with simple greedy techniques of n-gram selection, the generated cluster labels still constitute of list of reasonably coherent well-formed topics that are usually self-explanatory.

FIG. 12 presents the quantitative benchmarking of Incident Search, taking the following approach to vali-date its performance in the absence of any labeled evaluation data. To perform different ablation experiments, the following baselines and variants are considered: i) Random Baseline which retrieves random documents; ii) Simple Search where a sentence-level index is constructed over the PRB investigation document; iii) Combined Search where, in addition to the above Simple Search Index over the raw PRB documents, two more search indices are constructed: i) over the extracted investigation Topics (with each topic phrase as an index entry), and ii) a sentence-level index over the extracted Investigation Summary. The actual search is then conducted independently on the three search indices, with the same query and the search result-sets are collated by simple score aggregation for overlapping documents.

Each of the prepared 1.7K PRB documents may be used as the target, a natural language query is formulated based on the symptom extracted from it. Then the constructed faiss index is searched over the remaining PRB documents. FIG. 12 captures the similarity of the retrieved result-set with the target PRB. However, simple evaluation of the search results w.r.t the raw PRB documents is not very meaningful because of the frequent irrelevant information and common generic details repeating across PRBs. This is evident in the high average overlap scores with respect to the raw PRB document (row 1) for the Random baseline. Hence the overlap is computed between the target and retrieved PRB document with respect to these metrics over these following datafields: Phrase level Recall or Recall over B ag-Of-Nonstop-Words of the extracted Topic, Root Cause or Resolution BLEU-4 gram similarity with respect to the PRB Document, Subject and extracted Topics, Summary, Root Causes and Resolutions. Other than for PRB Subject, BLEU score is computed between a target list (of sentences or phrases) $(D_t=[\ldots, s_i, \ldots])$ and retrieved list $$(D_r = [\ldots, s_j, \ldots]) \text{ as } \frac{1}{|D_t|} \sum_{s_j \in D_t} \max_{s_j \in D_r} BLUE(s_i, s_j).$$

With this, the evaluated results presented in FIG. 12 are obtained by computing these metrics w.r.t the target value for i) Each of Top-10 search results, aggregated with Average or Maximum ii) Concatenation of the corresponding data fields of the Top-10 results. As FIG. 12 shows, the Simple Search over the raw PRB documents alone, does reasonably well and significantly better than the random baseline. The BLEU score over the full PRB document is indeed unnaturally high, because of the generic information commonly occurring in most incidents. Instead, the BLEU score over the investigation subject, topics or summary and BOW Recall over topics present a more accurate estimation of the search performance. Also, despite being too strict, performance with respect to phrase-level Recall of topics is also quite reasonable when the Max or Concatenation based aggregation is considered. Combined search performs even better, especially when evaluating with respect to Topics or Summaries owing to dedicatedly searching over this extracted targeted information. The other effect of the Combined search is reflected in the general improvement in the Concatenation mode of aggregation of top-K results, by boosting the incidents that are found to be relevant as per different search techniques. For each of these, the random baseline helps calibrate the real performance of the search model.

A survey of Incident Search results is conducted for 40 handcrafted queries, validated by domain experts. 32% of these queries had 1 clause, 56% had 2 clauses (e.g., high request rate and high jetty threads) and 12% had 3 clauses. All top-10 search results matched at least 1 query clause, and 53% and 40% results respectively matched 2 and 3 query clauses.

The evaluation of the retrieved search results is also provided with respect to the Root Cause and Resolution, where the 'Concatenation' over the top-10 results possibly is most meaningful as this summarizes the distribution of top K candidates, as constructed in. However, this does not reflect the real performance of a PRB based RCA pipeline, since only repeating incidents will contribute to the Recall or BLEU metrics. Around 6% of incidents have at least 50% word overlap in terms of Symptom, Root Cause and Resolution and 4% incidents are almost identical repeats. Hence the evaluation results presented in FIG. 12 and the upper limit of the performance is itself expected to be quite low. Despite the low performance skyline, achieving more than 30% BOW Recall and 50 BLEU points (by Concatenating) is testament to the usefulness of this simple retrieval-based RCA pipeline, leveraging only past incidents. Beyond this style of quantitative benchmarking of RCA, a more formal evaluation would require real incidents to be investigated and validated by domain experts.

Figure 14:
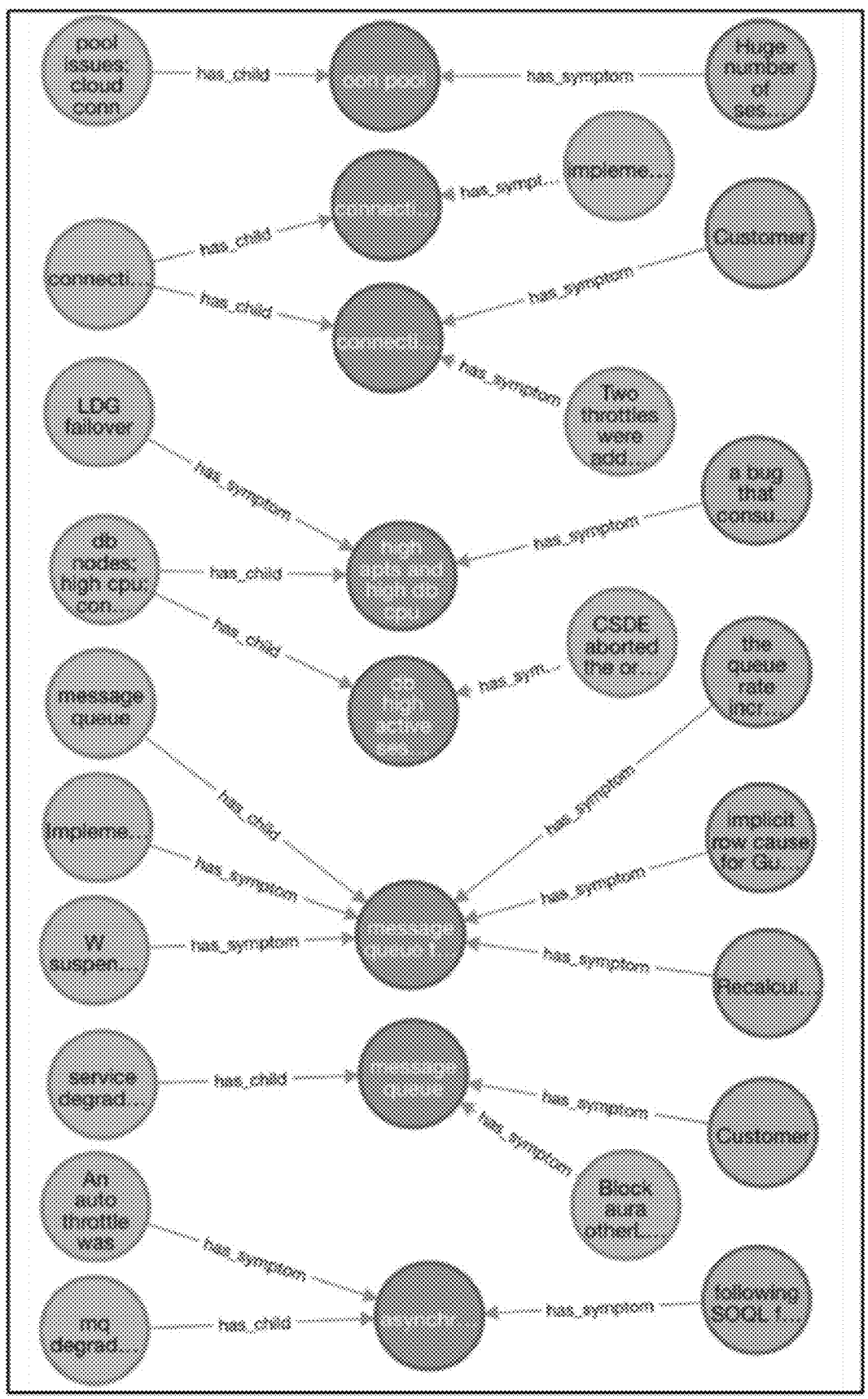

FIGS. 13-15 show an example of an incident investigation done by Site Reliability Engineers (SRE) with the help of the deployed Incident Search and retrieval-based RCA built on the ICM engine. As per the pipeline presented in FIG. 2, on detection of this anomalous incident, different hand-crafted workflows get auto triggered to first generate its symptom description, i.e., APT High Degraded Capacity High CPU regressed week over week. The symptom, typically being a collection of multiple clauses describing the different anomalous signals associated with the incident, can be arbitrarily long and complex. Still, the neural retrieval model was able to capture the different aspects of the query like Degraded capacity or High CPU and effects of high APT across various past incidents, overall providing a somewhat diverse set of results.

Incident Search for this query retrieved past incidents quite relevant to the symptom, e.g., Connection Pool and Message Queue issue are one of the predominant effects of high APT. Each of the retrieved results are represented in a crisp structured form, with the PRB Subject and the extracted Key Investigation Topics, Summary, Root Cause and Resolution, alleviating the need for tedious manual perusal of the original raw PRBs. Additionally, the SRE can also explore the Query specific Causal Knowledge Subgraph capturing symptoms and their symptom cluster, along with root causes and resolutions associated with the retrieved past incidents. Starting with this, the SRE can navigate the overall graph or the global and local clusters to get a more extensive causal view.

Finally, SRE can directly view the generated distribution of the top detected root causes and resolutions recommended by this retrieval-based RCA, summarizing the findings of past similar investigations. This allows the SRE to quickly cross-check if any of these root causes are indeed valid for the new incident, before starting any full-fledged manual investigation over service monitoring tools or tedious log data. For this incident, the SRE did a prompt verification and found (as highlighted in FIG. 15), some of the detected root causes to be indeed very relevant for the ongoing incident, e.g., Customer induced load . . . , Customer opened vaccination appointment, or SOQL queries from single customer . . . . Consequently, the top recommended resolution was to throttle uri, which is indeed the intuitive remedy for such root causes. On investigation, the incident was found to be indeed due to Performance tests being run by a vaccine cloud customer, which perfectly corroborates with the detected root cause. In fact, such similar incident repeated thrice in 10 days and the true root cause was detected by the simple retrieval-based RCA pipeline and promptly verified by the SRE, thus reducing the time and effort of a cold-start investigation. Undeniably such PRB based pipeline alone cannot serve as RCA of all incidents, rather only for the repeating ones. Regardless of that, even automating this important but tedious step of manually analyzing past incidents can make the overall RCA process more efficient.

Computer Environment

Figure 16:
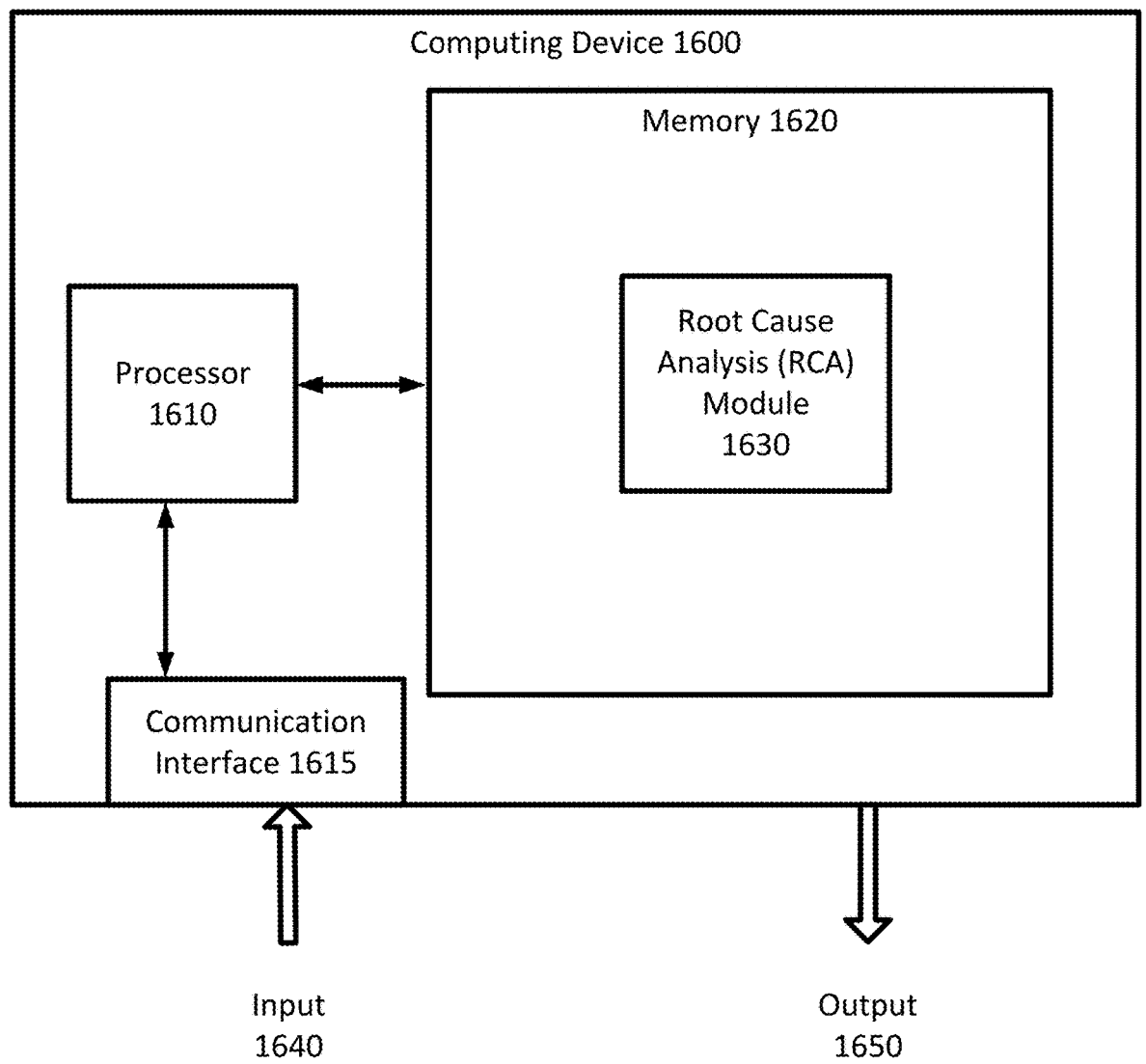
FIG. 16 is a simplified diagram of a computing device implementing the RCA framework and/or method described in FIGS. 1-5, according to some embodiments.

FIG. 16 is a simplified diagram of a computing device 1600 implementing the RCA framework and/or method described in FIGS. 1-5, according to some embodiments. As shown in FIG. 16, computing device 1600 includes a processor 1610 coupled to memory 1620. Operation of computing device 1600 is controlled by processor 1610. And although computing device 1600 is shown with only one processor 1610, it is understood that processor 1610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 1600. Computing device 1600 may be implemented as a stand-alone subsystem, as a board added to a computing device, and/or as a virtual machine.

Memory 1620 may be used to store software executed by computing device 1600 and/or one or more data structures used during operation of computing device 1600. Memory 1620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 1610 and/or memory 1620 may be arranged in any suitable physical arrangement. In some embodiments, processor 1610 and/or memory 1620 may be implemented on a same board, in a same package (e.g., system-in-package), on a same chip (e.g., system-on-chip), and/or the like. In some embodiments, processor 1610 and/or memory 1620 may include distributed, virtualized, and/or containerized computing resources. Consistent with such embodiments, processor 1610 and/or memory 1620 may be located in one or more data centers and/or cloud computing facilities.

As shown, memory 1620 includes a root cause analysis (RCA) module 1630 that may be used to implement and/or emulate the neural network systems and models described further herein and/or to implement any of the methods described further herein, such as but not limited to the method described with reference to FIG. 4. RCA module 1630 may be used, in some examples, for the generation of the causal knowledge graph for root cause analysis of incidents disrupting IT systems, and the generation of an incident report of a future service disrupting incident based on said causal knowledge graph.

In some examples, memory 1620 may include non-transitory, tangible, machine readable media that includes executable code that when run by one or more processors (e.g., processor 1610) may cause the one or more processors to perform the methods described in further detail herein. In some examples, RCA module 1630 may be implemented using hardware, software, and/or a combination of hardware and software. As shown, computing device 1600 receives input 1640 via a communication interface 1615, which is provided to RCA module 1630, which then may generate output 1650. For example, the communication interface may include a user interface that receives a user uploaded query. For another example, the communication interface may include a data interface that retrieves queries from a database.

In some embodiments, the input 1640 may include PRB documents having PRB data that include unstructured, open-ended natural language descriptions of incidents that disrupted services in a wide array of fields, including information technology (IT), a non-limiting example of which is cloud services, communications, industrial processes, etc. The PRB data includes symptoms of symptoms of incidents, key topics, summary and resolutions of the incidents as determined during investigations of the incidents by domain experts, root causes of the incidents, etc., described in the PRB documents in, as noted above, unstructured open-ended natural language format. In such embodiments, the output 1650 can include a causal knowledge graph having clusters of the various elements of the structured PRB data (e.g., such elements including but not limited to symptoms, resolutions, root causes, summaries, key topics, etc., of the incidents) where the clusters are causally related to each other.

In some embodiments, the input 1640 can be an indication of the occurrence of an incident. For example, a time series analysis of an IT system such as a cloud service may indicate an anomalous incident, an example of which for a cloud service includes but is not limited to average page time (APT) that is high. In such cases, the input 1640 can be an anomalous incident detection report including descriptions (e.g., symptoms, etc.) of the anomalous incident. In such embodiments, the output 1650 may include an incident report automatically generated based on the anomalous incident detection report and the causal knowledge graph. For example, the incident report may be generated without domain experts performing some or any of the investigative work that is usually performed to troubleshoot and address the detected anomalous incident. That is, the output 1650 may be an automatically generated incident report that is generated by the computing device 1600 (e.g., the RCA module 1630). For example, the RCA module may extract the symptom of the anomalous incident from the anomalous incident detection report and use the causal knowledge graph to identify the root cause of the anomalous incident without domain experts having to perform investigative work.

Some examples of computing devices, such as computing device 1600 may include non-transitory, tangible, machine readable media that include executable code that when run by one or more processors (e.g., processor 1610) may cause the one or more processors to perform the processes of method 400. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of root cause analysis in service incident investigations, comprising:
   receiving, at a communication interface, a query symptom indicating a detected incident from a requestor;
   retrieving a set of problem review board (PRB) documents comprising unstructured PRB data relating to historical incident information;
   extracting, from the unstructured PRB data, structured characteristics of historical incidents;
   generating, based on the structured characteristics relating to a historical incident, a causal sub-graph including a symptom node representing an incident symptom, a root cause node representing a root cause, and a resolution node representing a resolution;
   aggregating, by a processor running a clustering algorithm that includes hierarchically clustering incident symptoms of symptom nodes into symptom types and constructing a document of cluster labels by concatenating node labels in each cluster, causal sub-graphs corresponding to the historical incidents into a causal knowledge graph that causally relates a symptom cluster representing symptoms of the historical incidents, a root cause cluster representing root causes of the historical incidents and a resolution cluster representing resolutions of the historical incidents;
   storing, at a memory, the aggregated causal knowledge graph and the constructed document of cluster labels associated with different kinds of nodes in the aggregated causal knowledge graph; and
   transmitting, via the communication interface, a message of a detected root cause or a suggested resolution to the requestor in response to the query symptom by searching the causal knowledge graph.

2. The method of claim 1, wherein the structured characteristics include any combination of:
   an investigation topic;
   an investigation summary;
   a root cause;
   an immediate resolution; and
   a post action review.

3. The method of claim 1, wherein a node in the causal sub-graph corresponds to a node description represented as an average of token embeddings, weighted by normalized term-frequency.

4. The method of claim 1, wherein the aggregating further comprises:
   applying a global or a local affinity propagation based clustering on corresponding root-causes and resolutions through iterative message passing between nodes as functions of their similarity scores.

5. The method of claim 1, wherein the symptoms of the historical incidents are merged together by minimizing a sum of squared distances within all clusters.

6. The method of claim 1, wherein the global affinity propagation based clustering includes clustering all root causes collected from the set of PRB documents.

7. The method of claim 1, wherein the local affinity propagation based clustering includes clustering only root causes that are associated with symptoms within each cluster of a specific symptom-type.

8. The method of claim 1, wherein the document is constructed by:
   selecting a longest n-gram having a highest pointwise mutual information or likelihood ratio from the document; and
   re-ranking selected n-grams using average normalized term-frequencies of non-stopwords.

9. The method of claim 1, further comprising:
   in response to the received query symptom:
      retrieving relevant sentences over the set of PRB documents;
      scoring the retrieved relevant sentences based on vector similarity metrics; and
      aggregating sentence-level scores into document-level to obtain an overall score of the retrieved PRB documents.

10. The method of claim 1, further comprising:
    generating a root cause distribution from the set of retrieved PRB documents.

11. A system of root cause analysis in service incident investigations, comprising:
- a communication interface receiving a query symptom indicating a detected incident from a requestor;
- a memory storing a set of problem review board (PRB) documents comprising unstructured PRB data relating to historical incident information; and
- a processor performing operations comprising:
   - extracting, from the unstructured PRB data, structured characteristics of historical incidents;
   - generating, based on the structured characteristics relating to a historical incident, a causal sub-graph including a symptom node representing an incident symptom, a root cause node representing a root cause, and a resolution node representing a resolution;
   - aggregating, using a clustering algorithm that includes hierarchically clustering incident symptoms of symptom nodes into symptom types and constructing a document of cluster labels by concatenating node labels in each cluster, causal sub-graphs corresponding to the historical incidents into a causal knowledge graph that causally relates a symptom cluster representing symptoms of the historical incidents, a root cause cluster representing root causes of the historical incidents and a resolution cluster representing resolutions of the historical incidents;
   - storing, at the memory, the aggregated causal knowledge graph and the constructed document of cluster labels associated with different kinds of nodes in the aggregated causal knowledge graph; and
   - transmitting, via the communication interface, a message of a detected root cause or a suggested resolution to the requestor in response to the query symptom by searching the causal knowledge graph.

12. The system of claim 11, wherein the structured characteristics include any combination of:
- an investigation topic;
- an investigation summary;
- a root cause;
- an immediate resolution; and
- a post action review.

13. The system of claim 11, wherein a node in the causal sub-graph corresponds to a node description represented as an average of token embeddings, weighted by normalized term-frequency.

14. The system of claim 11, wherein the aggregating further comprises:
- applying a global or a local affinity propagation based clustering on corresponding root-causes and resolutions through iterative message passing between nodes as functions of their similarity scores.

15. The system of claim 11, wherein the symptoms of the historical incidents are merged together by minimizing a sum of squared distances within all clusters.

16. The system of claim 11, wherein the global affinity propagation based clustering includes clustering all root causes collected from the set of PRB documents.

17. The system of claim 11, wherein the local affinity propagation based clustering includes clustering only root causes that are associated with symptoms within each cluster of a specific symptom-type.

18. The system of claim 11, wherein the document is constructed by:
- selecting a longest n-gram having a highest pointwise mutual information or likelihood ratio from the document; and
- re-ranking selected n-grams using average normalized term-frequencies of non-stopwords.

19. The system of claim 11, wherein the operations further comprise:
- in response to the received query symptom:
   - retrieving relevant sentences over the set of PRB documents;
   - scoring the retrieved relevant sentences based on vector similarity metrics; and
   - aggregating sentence-level scores into document-level to obtain an overall score of the retrieved PRB documents.

20. A non-transitory machine-readable medium having stored thereon instructions configurable for performing a method for root cause analysis in service incident investigations, the instructions comprising machine executable code to cause a machine to perform operations comprising:
- receiving, at a communication interface, a query symptom indicating a detected incident from a requestor;
- retrieving a set of problem review board (PRB) documents comprising unstructured PRB data relating to historical incident information;
- extracting, from the unstructured PRB data, structured characteristics of historical incidents;
- generating, based on the structured characteristics relating to a historical incident, a causal sub-graph including a symptom node representing an incident symptom, a root cause node representing a root cause, and a resolution node representing a resolution;
- aggregating, by a processor running a clustering algorithm that includes hierarchically clustering incident symptoms of symptom nodes into symptom types and constructing a document of cluster labels by concatenating node labels in each cluster, causal sub-graphs corresponding to the historical incidents into a causal knowledge graph that causally relates a symptom cluster representing symptoms of the historical incidents, a root cause cluster representing root causes of the historical incidents and a resolution cluster representing resolutions of the historical incidents;
- storing, at a memory, the aggregated causal knowledge graph and the constructed document of cluster labels associated with different kinds of nodes in the aggregated causal knowledge graph; and
- transmitting, via the communication interface, a message of a detected root cause or a suggested resolution to the requestor in response to the query symptom by searching the causal knowledge graph.

* * * * *